United States Patent [19]

Brueggemann et al.

[11] Patent Number: 4,753,551
[45] Date of Patent: Jun. 28, 1988

[54] SEALING SCREEN FOR WASTE DUMPS

[75] Inventors: Heinrich Brueggemann, Hirschberg; Manfred Herzhauser, Ludwigshafen am Rhein; Gottfried Kochendoerfer, Weisenheim am Berg; Klaus Krubasik, Bad Duerkheim, all of Fed. Rep. of Germany

[73] Assignees: BASF Aktiengesellschaft, Ludwigshafen am Rhein; Bilfinger & Berger Bauaktiengesellschaft, Mannheim, both of Fed. Rep. of Germany

[21] Appl. No.: 930,402

[22] PCT Filed: Feb. 17, 1986

[86] PCT No.: PCT/DE86/00058

§ 371 Date: Dec. 18, 1986

§ 102(e) Date: Dec. 18, 1986

[87] PCT Pub. No.: WO86/04943

PCT Pub. Date: Aug. 28, 1986

[30] Foreign Application Priority Data

Feb. 19, 1985 [DE] Fed. Rep. of Germany ....... 3505687

[51] Int. Cl.$^4$ .......................... E02B 3/16; B09B 5/00; B65G 5/00
[52] U.S. Cl. ...................................... 405/128; 405/54; 405/267; 405/129
[58] Field of Search ...................... 405/53, 54, 55, 57, 405/128, 129, 258, 266-270; 210/170, 747; 252/633

[56] References Cited

U.S. PATENT DOCUMENTS

| 3,436,919 | 4/1969 | Shock et al. ............... 405/57 X |
| 4,112,690 | 9/1978 | Hosoya et al. .............. 405/55 X |
| 4,335,978 | 6/1982 | Mutch ........................ 405/129 |
| 4,352,601 | 10/1982 | Valiga et al. .............. 405/270 |
| 4,406,403 | 9/1983 | Luebke ..................... 405/270 X |
| 4,439,062 | 3/1984 | Kingsbury ................ 405/270 X |
| 4,451,173 | 5/1984 | Watson et al. ........... 405/270 X |
| 4,464,081 | 8/1984 | Hillier et al. ............... 405/128 |
| 4,474,053 | 10/1984 | Butler ...................... 405/54 X |
| 4,543,013 | 9/1985 | Wagner et al. ............ 405/128 |
| 4,632,602 | 12/1986 | Hovnanian ................ 405/128 |

FOREIGN PATENT DOCUMENTS

| 0130773 | 1/1985 | European Pat. Off. . |
| 2630345 | 10/1979 | Fed. Rep. of Germany . |
| 3041706 | 5/1982 | Fed. Rep. of Germany . |
| 3044436 | 6/1982 | Fed. Rep. of Germany . |
| 3415729 | 9/1984 | Fed. Rep. of Germany . |
| 95711 | 7/1980 | Japan ........................ 405/267 |
| 8401358 | 4/1984 | PCT Int'l Appl. ......... 405/270 |
| 1108160 | 8/1984 | U.S.S.R. ..................... 405/270 |

OTHER PUBLICATIONS

International Search Report, completed May 16, 1986, by the European Patent Office.

Primary Examiner—David H. Corbin
Assistant Examiner—John A. Ricci
Attorney, Agent, or Firm—Staas & Halsey

[57] ABSTRACT

A sealing screen for waste dumps, e.g., for garbage dumps and the like, consisting of protective impermeable layers. The layers include two sealing layers and a control filter layer that is interposed between sealing layers. Two piping systems, an injection line and a second line system, are arranged within the control filter layer. The sealing screen has individual areas which are partitioned off from each other by means of sealing connections between and perpendicular to the sealing layers. A collector shaft or a tunnel are provided for checking the seal integrity in each individual area. A drainage layer with a drainage line system is arranged above the top protective layer, and a sealing layer is provided for protection above the drainage layer against damage from the dumping of waste into the dump. In the event that the seal fails in a particular area, the control filter layer is filled with a hardening and sealing material via the pipes of the injection line for that area, with the result that the integrity of the seal is reestablished.

12 Claims, 3 Drawing Sheets

SEALING SCREEN FOR WASTE DUMPS

BACKGROUND OF THE INVENTION

The present invention relates to sealing screens for waste dumps, e.g., garbage dumps and the like, consisting of protective impermeable layers.

Sealing screens for waste dumps that are to be newly formed are known in many forms. West German Patent Publication No. DE-OS 30 44 436 describes a sealing screen that is produced from water and ash, in particular ash from a power station. West German Patent Publication No. DE-AS 26 30 345 describes a process in which a plastic foil, which is embedded in finely ground bulk or loose material, is used as a sealing screen. Other sealing screens are also known, these being produced from natural materials, such as clay.

The requirements placed on new waste or garbage dumps are extremely strict. Thus, not only is the highest quality and safety demanded of the materials and construction processes used for sealing screens demanded; also demanded is a capability for a rapid, cost effective and realiable repairability that must be able to cope with unforeseeable damage inflicted upon the sealing screen. Unforeseeable damage to the sealing screen can result from chemical conversion processes in a material that has been dumped, as some of such processes last a number of years. Further, damage may be caused by physical forces involved when the waste material is actually being dumped.

The sealing screens in use up to now do not permit the rapid and localized determination of damage in the screens and the rapid, cost effective, and reliable repairing of the screens. The repair of prior art sealing screens is only possible by using expensive and time consuming construction measures.

SUMMARY OF THE INVENTION

It is the object of the present invention to overcome such disadvantages. According to the present invention, this object has been achieved by utilizing a sealing screen with the following construction:

(a) two sealing layers (1) and (2), that are installed at a predetermined distance from each other;

(b) a control filter layer (3) between the sealing layers (1), (2), (c) an injection line system (4), that is installed in the control filter layer (3), (d) a second system of lines (5) within the control filter layer, that initially serves to inspect the first seal layer (1) and during an injection into the control filter layer (3) serves as an air and water removal system;

(e) a grid-like division of the sealing screen into individual areas, which in each instance are partitioned off from the adjacent individual areas by means of sealing connections (11) perpendicular to the sealing layer (1) and (2) and are connected through an accessible inspection and collection shaft (6) or a walkable tunnel (7) to a water removal line (8), (f) a drain layer (9) with a drainage line system to remove drainage water from material that has been dumped; and (g) a covering layer (10) for protecting the drain layer (9) when the material to be dumped is incorporated.

The incorporation of two sealing layers (1) and (2) into the sealing screen increases security and protection in contrast to single-layer sealing screens. Any damage to the first sealing layer (1) can be detected in a timely fashion, since the drainage water that is present in the material that is dumped immediately penetrates the control filter layer (3) and moves through the piping system (5) to the collector pit (6) or the tunnel (7), which are inspected on a regular basis.

Damage to the sealing screen is caused by whatever source is localized and can be located because of the grating-like and partitioned division of the individual areas of the sealing layers (1) and (2). Injection of sealing material and thus the complete sealing of the control filter layer (3) in the damaged areas can take place very rapidly and accurately by means of the pipes of the injection system (4), which results in the integrity of the seal being quickly re-established.

The invention provides for a testing procedure before the dump is put into operation in order that damage to the sealing layers (1) and (2) can be detected in a timely fashion when the sealing screen is still under construction and can be repaired directly. It is preferred that this checking is done prior to the installation of the drainage layer (9) and the covering layer (10), and is done section by section corresponding to the grid-like division of the sealing screen. The following is used in order to check a sealing screen which forms a base for a dump. Areas in the sealing screen are sub-divided by means of impermeable vertical supports. Piping systems in the areas are connected through air-tight connections to a vacuum pump. The air is evacuated from the individual area at the sealing screen. The partial vacuum that results from this between the two sealing surfaces is maintained for a period of time. Any resulting pressure increase once the pumps have been switched off will indicate improper sealing of the seal for the individual area. This process allows the base surface of the waste dump to be checked for seal integrity immediately after installation. A pressure gauge (12) is used to monitor the pressure during this process.

The invention also sets out a checking procedure to be instituted after the waste dump has been put into operation. After the successful checking of the seal base before dump use and after the start of filling the dump with waste material, the control filter layer (3) between the sealing layers (1, 2), which is filled with filter gravel, can be filled with water to the point that all the pores in the grvel are filled with water. Once an individual area of the sealing system has been filled, any loss of water can be read from a gauge on a level pipe (13) that is connected to the control filter area (3). This allows ongoing inspection of the individual areas of sealing system for seal integrity. A screw cap (14) installed on the level pipe (13) makes it possible to carry out the above-described check of the partial vacuum without any outside air getting into the system.

DESCRIPTION OF THE PREFERRED EMBODIMENT

Reference will now be made in detail to the invention and the present preferred embodiments of the invention, examples of which are illustrated in the accompanying drawings.

The invention is directed towards a sealing screen for waste dumps and the like. The sealing screen comprises several protective impermeable layers. The layers of the sealing screen combine to protect the environment, i.e., the ground water, etc., from waste deposited into the waste dump.

Figure 1:
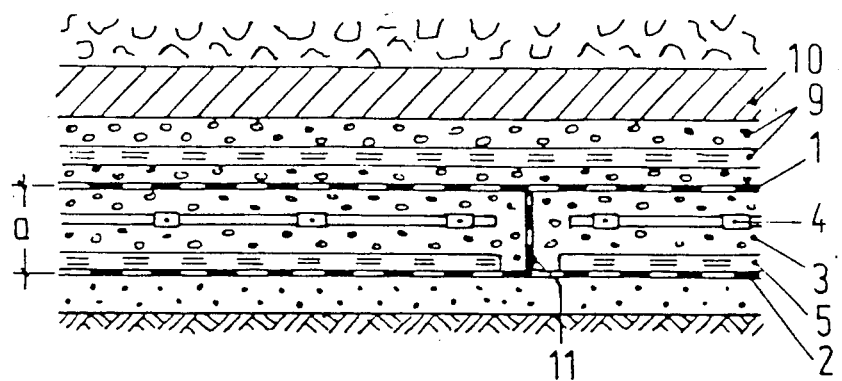
FIG. 1 shows a cross section of the sealing screen.

Referring now to FIG. 1, the sealing screen has a bottom sealing layer (2) installed against the ground. Above the bottom sealing layer (2) is a control filter layer (3). The control filter layer (3) will usually consist of some subtance such as filter gravel, and can be filled with water or some gas. Checking of the water level in the control filter level (3) allows for checking the integrity of the sealing screen, which will be described below. An injection line system (4), consisting of perforated piping, is installed in the control filter layer (3). The injection line system (4), which is accessable via an inspection and collection shaft (6) or an access tunnel (7), can be used to inject sealing compounds into selected areas of the sealing screen in the event a leak is discovered. Also in the filter control layer (3) is a piping system (5), which is also accessable via the inspection and collection shaft (6) or the access tunnel (7) and can be used for inspecting the seal screen and, during injection of sealing material through the injection line system (4) can be used to remove air and water from the control filter layer (3). This construction permits effective sealing of the sealing screen for a portion in which damage is discovered.

Figure 4:
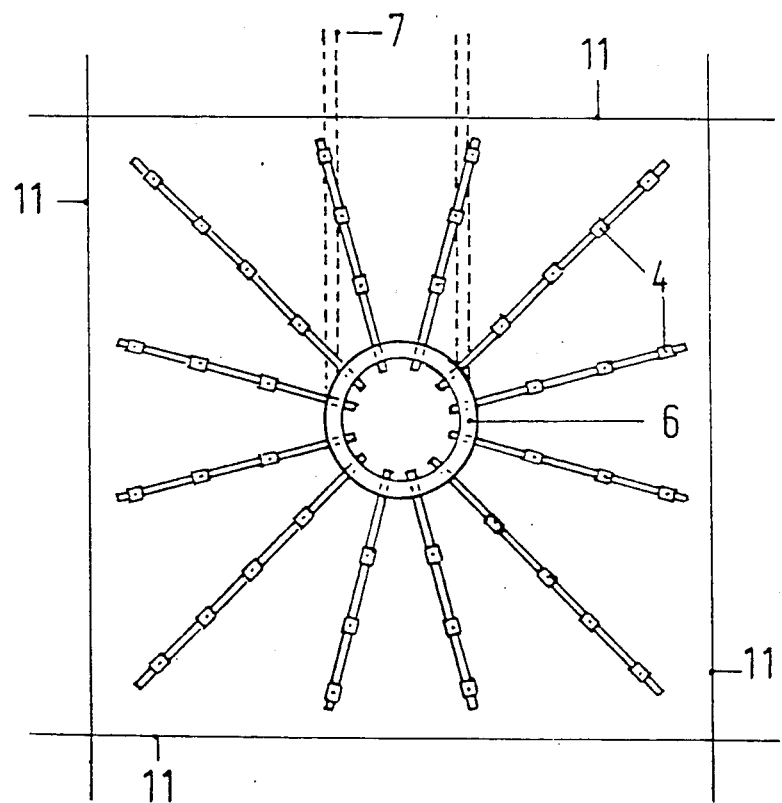
FIG. 4 shows a plan view of the grid-like surface division of the sealing screen with the sealed off and partitioned connections (11) between the sealing layers (1) and (2).

A second sealing layer (1) is formed on the far side of the control filter layer (3) from the bottom sealing layer (2). The first and second sealing layers (2), (1) are installed at a predetermined distance from each other. This portion of the sealing screen is partitioned into individual areas by means of vertical sealing connections (11). As illustrated in FIG. 4, the sealing connections (11) abut to form small sealed regions or areas in the of sealing screen. In FIG. 4, two alternative embodiments are illustrated. The first shows an inspection and collection shafts (6) centered in the small region of the sealing screen. Access can be had to the injection system (4) and the piping system (5) from within the inspection and collection shaft (6). The inspection and collection shaft (6) is large enough so that a human inspector can enter the shaft and check conditions of the surrounding area using the pipes. Alternatively, access tunnel (7) is illustrated in cross hatching. Instead of the inspection and collection shaft (6), which is vertical, a horizontal access tunnel (7) can be used for access to a series of small sealed regions of the sealing screen for inspecting the piping system (5) and the injection system (4) to determine seal integrity.

Referring once again to FIG. 1, a drain layer (9) having a drainage line system for removing water which drains from material that has been dumped is provided on top of the second sealing layer (1). On top of the drain layer (9), a covering layer (10) is provided for protecting the drain layer (9) from the waste material while it is deposited into the dump area.

Figure 2A:
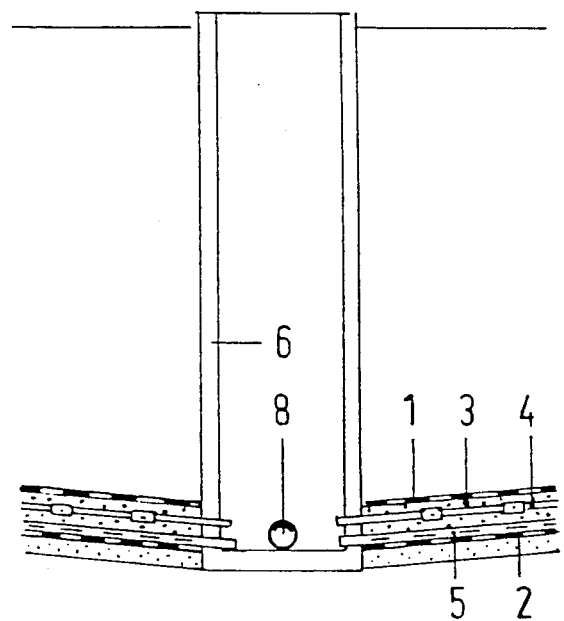
FIG. 2a shows an embodiment of the present invention having an inspection and collector shaft.

One embodiment of the present invention provides for the vertical inspection and collection shaft (6) to be provided for each subdivided region of the sealing screen. As illustrated in FIG. 2a, the shaft (6) allows access to the injection system (4) and the piping system (5) for a person who can descend the shaft (6) from above.

Figure 2B:
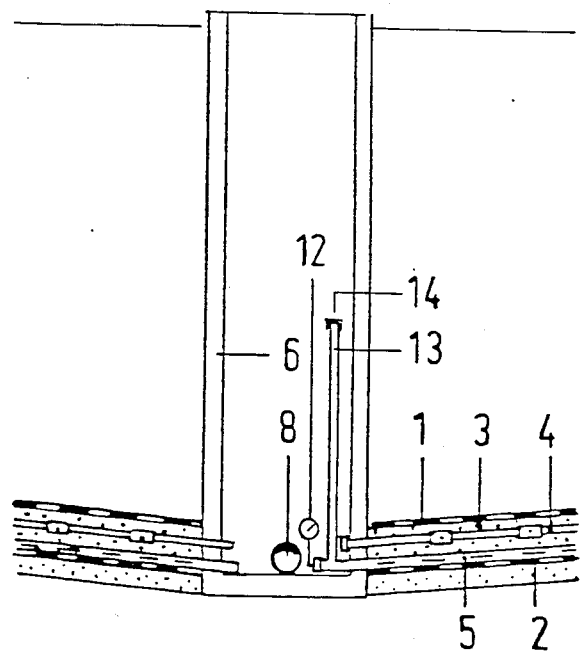
FIG. 2b shows another embodiment of the present invention illustrating the inspection system.

Referring now to FIG. 2b, elements of the present invention pertaining to checking of the seal are illustrated. Basically, as each subdivided area of the sealing screen should be airtight, connecting a vacuum pump to the piping system (5) and pumping out the air in the sealed area should result in a partial vacuum being formed in the area between the two sealing layers (1) and (2). A pressure gauge (12), installed on an end of a piping system (5), will indicate any pressure increase after the vacuum pump has been switched off. Any pressure increase would indicate that improper sealing has developed. This method of inspecting the seal should be used before the drain layer (9) and the covering layer (10) are installed, so that any damage to the sealing layers (1) and (2) can be repaired directly.

Figure 3:
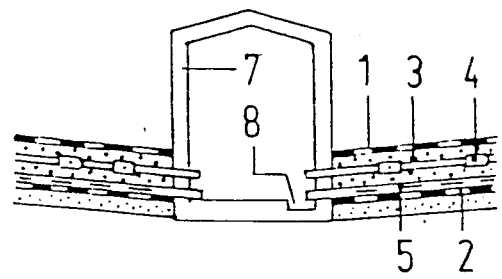
FIG. 3 shows a cross section of the sealing screen integral with an inspection tunnel according to another embodiment of the present invention.

Another test procedure allows the seal of each area to be inspected after the waste dump has been made operational. Upon making the waste dump operational, the filter control layer (3) is filled with water or gas at a predetermined pressure. Any loss of water from the filter control layer (3) can be read from a level gauge (13) provided in the shaft (6) or the access tunnel (7). The level gauge (13) is usually connected to a pipe from the piping system (5). During the vacuum check operation of the sealing system, the level gauge (13) can be made airtight using a screw cap (14). In the event that it has been discovered that the integrity of the sealing screen has been breached, sealing material can be injected into the area between sealing layers (1) and (2) using the pipes of the injection system (4). At the same time, air and water are removed from the area between the sealing layers (1), (2) via the piping system (5). As illustrated in FIG. 2b for the embodiment utilizing the shaft (6) and in FIG. 3 for an embodiment using the access tunnel (7), the piping system (5) can connect to a water removal line (8) which will remove the water from the access tunnel (7) or the shaft (6).

The injection line system (4) is composed of collar pipes. The injection line system (4) comprises numerous individual pipes which converge on the vertical shaft (6) or the access tunnel (7). Each individual pipe has an end valve for producing an airtight seal.

The sealing layers (1) and (2) can be composed of a mineral material, or composed of some kind of plastic foil. Alternatively, one layer can be composed of the plastic foil, and the other of mineral material. The material is selected on the basis of the waste material for which the dump is to be used to store.

Previously, the sealing screen has been described as a horizontal construction having a bottom sealing layer (2) and a top sealing layer (1). In practice, the sealing screen can have almost any orientation from the horizontal to the vertical.

Also, the method for checking the sealing layers (1), (2) before the dump is made operational is described in relation to creating a vacuum in the individual section. Alternatively, the individual area of seal can be pressurized, and the integrity of the seal can be checked by a pressure gauge, from which detected change in pressure would indicate a leak in the seal.

Similarly, in testing the sealing screen after the dump has been made operational, any gas or liquid could be injected under pressure into the filter control layer (3).

Once again, a decrease in pressure would indicate a leak. Alternatively, gas or liquid having a pressure lower than the atmospheric pressure can be used in the seal. Detection of an increase of pressure in the sealing screen would then denote a lack of integrity in the sealing screen.

The embodiments of the invention in which an exclusive property or privilege is claimed are defined as follows:

1. A sealing screen for a waste dump, comprising:
   a first sealing layer forming a first impermeable seal;
   a control filter layer adjoining said first sealing layer;
   an injection line system located in said control filter layer for injecting sealing material into said control filter layer;
   a second piping system located in said control filter layer for inspecting the sealing screen and removing gas and liquid from said control filter layer;
   a second sealing layer adjoining said control filter layer opposite to said first sealing layer forming a second impermeable seal;
   a plurality of impermeable sealing connections perpendicular to and connecting said first and second sealing layers for dividing the sealing screen into a plurality of individual areas, each of said areas being impermeably sealed from each other;
   a drain layer adjoining said second sealing layer opposite said control filter layer having a drainage line system for removing water drained from waste material deposited in the waste dump; and
   a covering layer adjoining said drain layer for protecting said drain layer.

2. A sealing screen for a waste dump according to claim 1, further comprising an access tunnel for allowing access to each of said individual areas for inspecting each of said areas for seal integrity.

3. A sealing screen for a waste dump according to claim 1, further comprising a plurality of inspection and collection shafts, one corresponding to each of said areas, for allowing access to said injection line system and said second piping system for inspecting each of said areas for seal integrity.

4. A sealing screen for a waste dump according to claim 3, wherein said injection line system is construction with collar pipes.

5. A sealing screen for a waste dump according to claim 4, wherein said injection line system for each of said individual areas comprises a plurality of individual collar pipes each having an end valve.

6. A sealing screen for a waste dump according to claim 5, wherein the sealing material injected by said injection line system is selected for the waste material deposited in the dump.

7. A sealing screen for a wasate dump according to claim 3, wherein said first and second sealing layers consist of a mineral material.

8. A sealing screen for a waste dump according to claim 3, wherein said first and second sealing layers consist of plastic foil.

9. A sealing screen for a waste dump according to claim 3, wherein one of said sealing layers consists of a mineral material and the other of said sealing layers consists of plastic foil.

10. A sealing screen for a waste dump according to claim 3, wherein said sealing screen can be oriented in any direction.

11. A method for detecting seal integrity of a sealing screen having first and second impermeable sealing layers separated by a control filter layer, said method comprising the steps of:
    producing a partial vacuum in the control filter layer;
    monitoring the control filter layer for a change in pressure representative of a lack of seal integrity; and
    injecting sealing material into the control filter layer in response to the change in pressure representative of a lack of seal integrity.

12. A method for detecting lack of seal integrity in a sealing screen for a wasate dump having first and second impermeable sealing layers separated by a control filter layer before the waste dump is operational, said method comprising the steps of:
    injecting a gas having a predetermined pressure into the control filter layer;
    monitoring the control filter layer for a change in pressure indicative of a lack of seal integrity; and
    repairing the sealing layers in response to the pressure change indicative of a lack of seal integrity.

* * * * *